United States Patent

[11] 3,624,369

| [72] | Inventor | Ruloff F. Kip, Jr.<br>Inningwood Road, Ossining, N.Y. 10562 |
|---|---|---|
| [21] | Appl. No. | 847,234 |
| [22] | Filed | Aug. 4, 1969 |
| [45] | Patented | Nov. 30, 1971 |

[54] THICKNESS REDUCTION CONTROL SYSTEMS
11 Claims, 9 Drawing Figs.

[52] U.S. Cl. .................................................. 235/151.1, 72/8
[51] Int. Cl. ....................................... B21b37/12, G05d 5/02
[50] Field of Search ............................................ 235/151.11, 151, 151.1; 33/143, 147; 72/11, 12, 16, 28

[56] References Cited
UNITED STATES PATENTS

| 3,015,974 | 1/1962 | Orbom et al. ................... | 235/151.11 X |
| 3,104,566 | 9/1963 | Schurr et al. ................... | 235/151.11 X |
| 3,169,424 | 2/1965 | Branscom et al. .............. | 235/151.11 X |
| 3,197,986 | 8/1965 | Freedman et al. .............. | 235/151.11 X |
| 3,253,438 | 5/1966 | Stringer .......................... | 235/151.11 UX |
| 3,269,160 | 8/1966 | Halter et al. .................... | 235/151.11 X |
| Re.25,075 | 10/1961 | Hessenberg ..................... | 72/9 |
| 3,054,311 | 9/1962 | Murtlano ......................... | 72/9 |
| 3,387,471 | 6/1968 | Freedman ....................... | 72/9 |
| 3,444,713 | 5/1969 | Barnikel .......................... | 72/9 |

Primary Examiner—Malcolm A. Morrison
Assistant Examiner—Joseph F. Ruggiero

ABSTRACT: In an installation for reducing the thickness of material, the thickness reduction is controlled by computing systems based on equations in which the predicted thickness error is a function of the differential between the input and output lengths of a given volume of material passing through the installation. Greater accuracy may be obtained by disclosed modes of follow-on control. Procedures are discussed for recalibration of the systems.

PATENTED NOV 30 1971 3,624,369

PATENTED NOV 30 1971 3,624,369

THICKNESS REDUCTION CONTROL SYSTEMS

This invention relates to the controlling of systems in which a body of material is passed through means which works on the material to reduce it in size in one or more directions normal to the direction of passage. The invention is thus applicable to tube or bar mills, wire drawing equipment and like size-reducing installations hereinafter referred to generically by the term "mill." For illustrative purposes, however, the invention is described herein in terms of its exemplary application to the controlling of mills for rolling metal strip.

A number of proposals have been made by others for controlling a strip mill in accordance with the "constant-volume principle" which merely states that the whole volume of material entering the mill equals the whole volume which exits therefrom. Assuming that the strip width remains constant, such principle may be expressed as $$L_1 G_1 = L_2 G_2 \quad (1)$$

where $L_1$ and $G_1$ are, respectively, the length and actual thickness of strip segment of strip which is an input to the mill, and $L_2$ and $G_2$ are, respectively, the length and actual thickness of the same segment of strip after it has been rolled to be reduced in thickness and to provide an output from the mill.

With successive input segments of strip fed to the mill in practice the input thickness $G_1$ will or may vary from segment to segment so as to cause variations in the output thickness $G_2$ of the resulting output segments unless correcting action is taken by adjusting the size of the gap between the rolls of the mill. On the other hand, it is an object in rolling mill operation for $G_2$ at all times to approximate as closely as possible to a desired nominal constant output thickness $\overline{G}_2$. To that end, the known constant volume principle has been made use of to compute from measurements of $G_1$, $L_1$ and $L_2$ a signal $\Delta G_2$ which is the predicted thickness deviation from $\overline{G}_2$ of each output segment and to then correct the roll gap size in accordance with $\Delta G_2$ so as to tend to reduce to zero the actual thickness deviation between $G_2$ and $\overline{G}_2$.

In accordance with an aspect of the present invention, a signal $\Delta G_2$ or other signal of a predicted or inferred thickness quantity is obtained by methods and means which are based upon the recognition of a previously unrecognized volumetric relationship which can be postulated as obtaining between a body of material entering a mill and the same body of material after it has passed through mill. Such relationship is referred to herein as the "$\Delta V$" relationship or principle. The statement thereof is that, given a body of material passing through a size-reducing mill, the whole volume V of that body can be considered as divided into an incremental volume $\Delta V$ and a remaining volume $V - \Delta V$ which, preserve their respective identities and each stay constant in value during passage through the mill and which, moreover, are adapted to yield solutions for $G_2$ (or other predicted thickness quantity signal) from the relationship $$\Delta V_1 = \Delta V_2 \quad (2)$$

where $\Delta V_1$ and $\Delta V_2$ are designations of the value of the incremental volume "$\Delta V$" on, respectively, the input side and the output side of the mill. Those solutions permit the development of a $\Delta G_2$ signal (or other predicted thickness quantity signal) by computational modes of signal processing which are different in character from those proposed for that purpose by the prior art, and which are adapted to yield the advantages over comparable prior art proposals of simplification of the signal processing and of more accurate results.

For a better understanding of the described aspect of the invention and of other aspects, objects and advantages thereof, reference is made to the following description to the accompanying drawings wherein.

Figure 1:
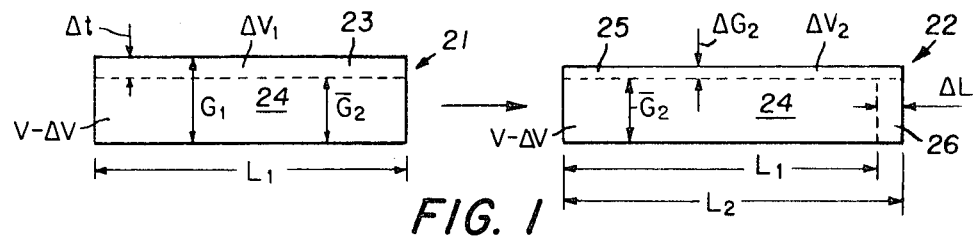
FIGS. 1 and 2 are diagrams explanatory of mathematical derivations set out herein.

Considering FIG. 1, reference numeral 21 designates a segment of metal strip which is an input to a thickness-reducing mill (not shown), the whole segment being shown by solid lines. Segment 21 has a length $L_1$ and an average actual thickness $G_1$. Since $G_1$ is an average thickness, segment 20 is assumed as having an actual thickness $G_1$ at every point along its length $L_1$. The thickness $G_1$ is variable from segment to segment of the strip to which segment 20 belongs. As the length $L_1$ of each such segment in the strip is decreased to approach zero, the quantity $G_1$ tends to more closely approach the point-to-point instantaneous thickness of such strip. As a practical matter of measurement, there is no advantage in reducing the considered length $L_1$ per segment beyond the finitely small length which is needed to obtain a single measurement of $G_1$ per segment. Hence, in practice, the nearest to which the value of $G_1$ per segment can approach the ideally measurable point-to-point instantaneous thickness of the strip is the actually measurable average thickness value per segment of segments having that finitely small length.

It can be predicted, that if input segment 21 is passed through a thickness-reducing mill, the result will be an output segment 22 having a length $L_2$ and a thickness $G_2$ equal to the desired thickness $\overline{G}_2$ plus (algebraically) a positive or negative deviation from $\overline{G}_2$ which is designated as $\Delta G_2$. The predicted error $\Delta G_2$ can be of zero value (if the mill is adjusted exactly right) but is more likely to be of measurable magnitude. The volume $V_2$ of segment 22 is assumed to be the same as the volume $V_1$ of segment 21, and both segments are assumed over their whole lengths as having the same width W which, for convenience, is assumed to have a value of unity.

From what has been said, it will be evident that the conversion of segment 21 into segment 22 amounts to a change in shape without any change in volume. Irrespective of how such change of shape is effected in practice, for present purposes, it can be considered as being effected as follows. First, from the top of segment 20 there is removed a thickness layer 23 having a volume $\Delta V_1$, a length $L_1$ and a thickness $\Delta t$ where $\Delta t$ is the difference between $G_1$ and $\overline{G}_2$. The remaining portion 24 of input segment 21 is used as the starting portion for building up the output segment 22.

To form the output segment, a portion of the volume $\Delta V_1$ of the material in removed layer 23 is reshaped and deposited on top of portion 24 as a layer 25 having a thickness $\Delta G_2$ and a length $L_2$ so that layer 25 juts out from the front end of portion 25 by a distance $\Delta L$ equal to $L_2 - L_1$. Then, the remainder of removed layer 23 is reshaped into a rectangular body 26 of thickness $\overline{G}_2$ and length $\Delta L$ and is attached to the front end of layer 25. By the procedure just described, the shape of input segment 21 has been changed into the shape of output segment 22 in a way indicated by the dotted lines appearing within the solid outline of the output segment.

Since the incremental volume $\Delta V_1$ of the removed layer 23 is equal to the volume $\Delta V_2$ provided together by layer 25 and body 26, the discussed reshaping procedure permits the "$\Delta V$" relation set out by expression (2) to be rewritten as;

$$L_1 \Delta t = L_2 \Delta G_2 + \overline{G}_2 \Delta L \quad (3)$$

Then, application of conventional algebraic operations to expression (3) YIELDS:

$$L_1 \Delta t - \overline{G}_2 \Delta L = L_2 \Delta G_2 \quad (4)$$
$$(L_1 \Delta t - \overline{G}_2 \Delta L)/L_2 = \Delta G_2 \quad (5)$$

in which $L_1$, $L_2$, $\Delta L$, $\Delta t$ and $\overline{G}_2$ are known or determined quantities and $\Delta G_2$ is the unknown quantity to be solved for. It will be noted that equation (5) is an explicit solution for $\Delta G_2$.

Both of equations (4) and (5) are of convenient form to be simulated by computational modes of signal processing intended to yield a $\Delta G_2$ signal (or its practical equivalent) as an output.

One of the more difficult signal operations to perform with accuracy in computations carried out by signal processing is the division of one dynamically variable value signal by another dynamically variable value signal. In, however, the practical implementations of equations (4) and (5), the need for division of such sort can be avoided by making the quantity $L_2$ of a known predetermined value for any single solving for $\Delta G_2$.

Another set of equations based on a different incremental volume $\Delta V'$ may be derived by "working backwards" (FIG. 2) from an output segment 32 of volume $V_2'$, thickness $\overline{G}_2+\Delta G_2$ and length $L_2$ to an input segment 31 of volume $V'_1$, thickness $G_1$ and length $L_1$. To effect the conversion from 32 to 31 there is cut off from one end of segment 32 a stub 33 which has a volume $\Delta V'$, length $\Delta L$ and thickness $\overline{G}_2+\Delta G_2$, and which leaves behind a segment remainder 34 having a volume $V'-\Delta V'$, thickness $\overline{G}_2+\Delta G_2$ and length $L_1$. Note that $\Delta V'=\Delta L(\overline{G}_2+\Delta G_2)$ and hence, is not the same as the $\Delta V=L_1(G_1-G_2)$ used in connection with the earlier equations.

The incremental volume $\Delta V'$ of cutoff stub 33 is reshaped and deposited on top of portion 34 as a layer portion 35 having a volume $\Delta V'$, a thickness $\Delta t-\Delta G_2$ and, a length $L_1$. At this point, the input segment 31 consisting of portions 34 and 35 has been built up from output segment 32, inasmuch as portions 34 and 35 together have a volume $V'$, thickness $G_1$ and length $L_1$. At the same time, the FIG. 2 procedure would, as so far discussed, lead to the same equations as those derived by the FIG. 1 procedure.

Figure 2:
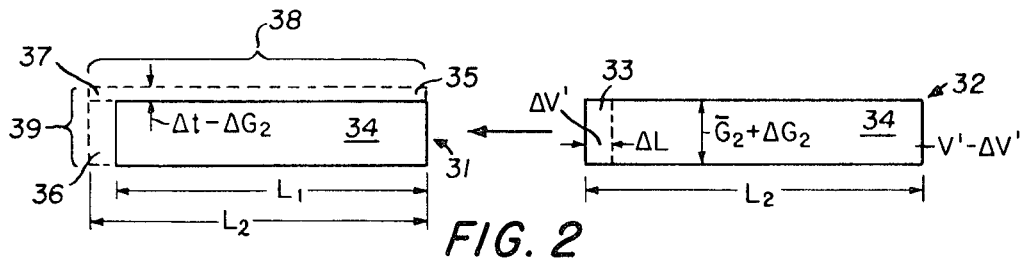

We can, however, carry the FIG. 2 procedure further however, the adding more material to input segment 31. Specifically, let us say we lengthen 31 to $L_2$ by adding to one end thereof a stub 36 provided by material other than from output segment 32 and having a thickness $\overline{G}_2+\Delta G_2$ and length $\Delta L$. Next, with such other material we fill in the corner between stub 36 and layer 35 by a corner portion 37. Portions 35 and 37 together form a layer 38 which overlaps in respect to corner portion 37 with a stub 39 formed of portions 36 and 37. Since, however, the portions 35 and 36 of layer 38 and of stub 39, respectively, have the same volume $\Delta V'$, and since layer 38 and stub 39 each possess the same additional volume of corner portion 37, layer 38 and stub 39 are necessarily equal in total volume. The volume of layer 38 is $L_2(\Delta t-\Delta G_2)$. The volume of stub 39 is $G_1\Delta L$. Hence, $$G_1\Delta L = L_2(\Delta t - \Delta G_2) \quad (6)$$

or $$L_2\Delta t - G_1\Delta L = L_2\Delta G_2 \quad (7)$$

$$\frac{L_2\Delta t - G_1\Delta L}{L_2} = \Delta G_2 \quad (8)$$

Further, since $G_1=\overline{G}_2+\Delta t$, from expression (8), it follows that:

$$\Delta t - \frac{(\overline{G}_2+\Delta t)\Delta L}{L_2} = \Delta G_2 \quad (9)$$

In the practical implementation of equations (7), (8) AND (9), the mentioned division problem can be avoided as before by making the $L_2$ of predetermined value. Equation (9), however, permits avoidance of the division problem in another way, namely by setting $L_2$ equal to $(\overline{G}_2+\Delta t)$. If such is done, then (9) reduces to the expression:

$$\Delta t - \Delta L = \Delta G_2 \quad (10)$$

which is of interest because it is so simple and involves nothing but differential quantities.

In the practical implementation of all the above equations for the purpose of reducing the thickness of a body of material to the desired value $\overline{G}_2$, the control over the output thickness may be somewhat imperfect so that, despite the use of a $\Delta G_2$ signal of predicted error in output thickness to drive the actual output thickness towards $\overline{G}_2$, there may remain a residual error $\Delta G_{2n}$ in actual output thickness. That is, after the fact, it can be seen that the error quantity used for control purposes should have been changed from $\Delta G_2$ to $\Delta G_2+\Delta_{G2n}$ where $\Delta G_{2n}$ is positive and negative in sign when the actual output thickness $G_2$ is, respectively, greater than and less than $\overline{G}_2$.

Expression (7) can be modified to solve for a predicted error quantity $\Delta G_2+\Delta_{G2n}$ by adding $L_2\Delta G_{2n}$ to both sides of (7) so as to yield:

$$L_2\Delta t + L_2\Delta G_{2n} - (\overline{G}_2+\Delta t)\Delta L = L_2(\Delta G_2+G_{2n}) \quad (11)$$

$$L_2\Delta h - (\overline{G}_2+\Delta t)\Delta L = L_2(\Delta G_2+\Delta G_{2n}) \quad (12)$$

Where the differential quantity $\Delta h=\Delta t+\Delta G_{2n}$. Equation (12), however, has the disadvantage in the practical implementation thereof that it involves two differential thickness quantities, namely, the quantities $\Delta t$, and $\Delta h$. That disadvantage can be avoided by making exact equation (12) an approximative one by further adding only to the left side of (12) the quantity $\Delta G_{2n}\Delta L$ so as to yield:

$$L_2\Delta h - (\overline{G}_2+\Delta h)\Delta L = L_2(\Delta G_2+\Delta G_{2n}) \quad (13)$$

The left hand side of (13) is a valid approximation to the right hand side thereof because, as $(\Delta G_2+\Delta G_{2n})$ is reduced to cause the right hand side to approach and reach zero, the left-hand side of (13) also approaches and reaches zero.

From the foregoing discussion of (13), it will be evident that equation (9) can likewise be converted from an exact to an approximative equation so as to yield:

$$\Delta h - \frac{(\overline{G}_2+\Delta h)\Delta L}{L_2} = \Delta G_2 + \Delta G_{2n} \quad (14)$$

and that, further, equation (10) can similarly be converted from exact to approximate so as to yield;

$$\Delta h - \Delta L = \Delta G_2 + \Delta G_{2n}$$
(where $L_2=\overline{G}_2+\Delta h$) (15)

By way of general comment on the foregoing equations, one or more of them have the following features.

First, all the equations are based on the constant incremental volume or "$\Delta V$" principle.

Second, all the equations include the term $\Delta L$ which is the differential between the measured quantities $L_1$ and $L_2$. A $\Delta L$ signal is not, however, a measure of either $L_1$ or $L_2$ when both are variable because, in combining $L_1$ and $L_2$ to form $\Delta L$, the previous respective values of $L_1$ and $L_2$ become irreversibly merged in the value of $\Delta L$ so that $\Delta L$ is not a meaningful measure of either $L_1$ or $L_2$. It follows that a signal representative of the term $\Delta L$ divided by another length quantity such as $L_1$ or $L_2$ does not provide a meaningful measure of the value of a ratio existing between measured lengths $L_1$ and $L_2$ or between those measured lengths when each is divided by the same value of some other parametric quantity such as time.

Second, while all of the foregoing equations include length quantities having the dimension "L," none of the equations include a velocity quantity having the dimension "L/T." That is, none of such equations include a term representative explicitly or implicitly of the parametric quantity of velocity.

Third, each of the foregoing equations include a quantity $\Delta t$ or $\Delta h$ which is representative of the differential between the actual input thickness $G_1$ of a segment of strip and some other thickness value which is not the nominal input thickness $\overline{G}_1$ of the input segment. Such is so because $\Delta t=G_1-\overline{G}_2$ and $\Delta h=G_1-\overline{G}_2+\Delta G_{2n}$. In combining the variable quantity $G_1$, the fixed quantity $\overline{G}_2$ and the variable quantity $\Delta G_{2n}$ to form $\Delta h$, the respective values of $G_1$ and $\Delta G_{2n}$ are irreversibly merged into the value of $\Delta h$ so that $\Delta h$ is not a meaningful measure of $G_1$.

Fourth, in the practical implementations of the equations, the problem of electrically dividing one dynamically variable signal by another dynamically variable signal can be avoided by making $L_2$ of a predetermined value for any such solving for the predicted error quantity. In the case of practical implementations of equations (10) AND (15), the electrical division problem can alternatively be avoided by the technique of setting $L_2$ equal to $\overline{G}_2+\Delta t$ (in equation 10) or equal to $\overline{G}_2+\Delta h$ (in equation 15).

It should be pointed out that it is not considered necessary to have a control system according to the invention to reflect all of the features just discussed of the foregoing equations, providing, of course that such control system reflect one or more of such features or some other aspect or aspects of the present invention.

PRACTICAL IMPLEMENTATIONS

Figure 3:
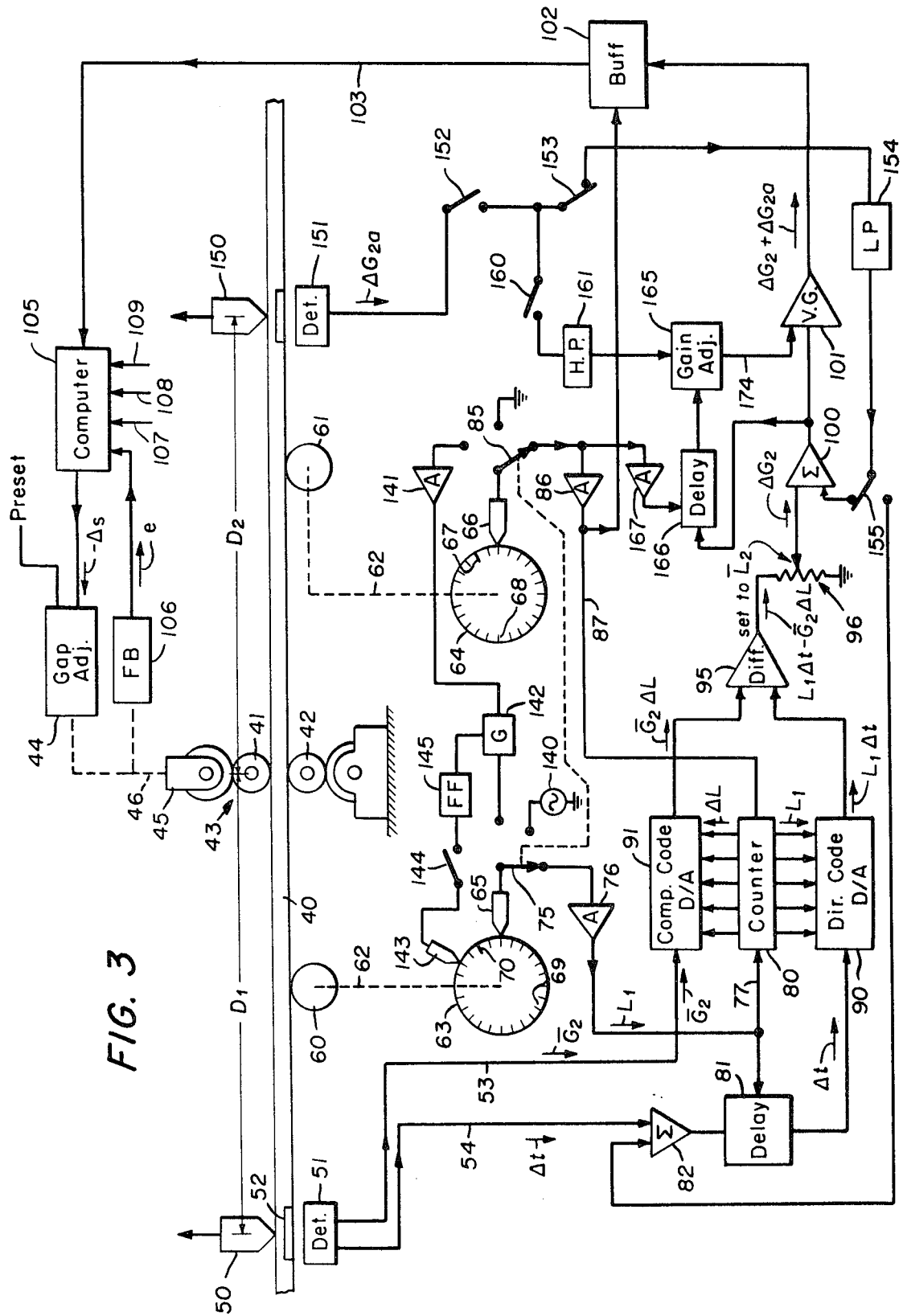
FIG. 3 is a schematic diagram of an exemplary system according to the invention.

In FIG. 3, reference numeral 40 designates a section of a metal strip unwound from a leftward payoff reel (not shown) and wound on a rightward motor-driven takeup reel (not shown) so as to be drawn through the upper and lower rolls 41 and 42 of a stand 43 of a 4-high rolling mill. The size of the gap between rolls 41 and 42 is adjustable by means of a well known signal-responsive mechanism 44 (such as, say, a signal-controlled screwdown mechanism) coupled to the vertically movable chocks 45 for the upper roll by a mechanical coupling indicated by dash line 46.

Disposed on the input side of the stand 43 is an X-ray gauge comprised of an X-ray source 50 and an X-ray detector unit 51. Source 50 is disposed near one edge of the strip so that separate beams from the source are incident on, respectively, first and second X-ray detectors within unit 51 after passing through, respectively, the thickness of strip 40 itself and the thickness of a standard metal sample 52 disposed next to the strip and having a thickness of $\overline{G}_2$. The signal from the second detector is supplied directly from unit 51 on lead 53 as a $\overline{G}_2$ signal. Also, the signal from the second detector is differentially combined with that from the first detector to supply from unit 51 on lead 54 a $\Delta t$ signal.

Strip 40 on the input and output sides of stand 43 is in contact with respectively rolls 60 and 61 coupled by shafts or other motion transmitting means (indicated by dash lines 62) to, respectively, the discs 63 and 64. On the peripheries of the discs are magnetic tracks in which are recorded indicia (shown for convenience as being on the sides of the discs) passing beneath read heads 65 and 66 for, respectively, the discs 63 and 64. Disc 64 has thereon either one primary indicia 67 or two or more such indicia equally spaced around the disc. Also, disc 64 has thereon a substantially greater number of equiangularly spaced secondary indicia 68 providing a substantially weaker output signal from head 66 than do the one or more indicia 67.

In the FIG. 3 system, unit length $u$ along strip 40 is defined as the distance which the strip must move over roll 61 to cause disc 64 to move through an angular interval equal to that swept out by the disc from one detection to the next of a primary indicia by head 66. That is, $u$ corresponds to an angular interval of $A_2 = 360°/N$ where $N$ is the number of the one or more indicia 68 on the disc.

For each such angular interval $A_2$ on disc 64 there corresponds on disc 63 an angular interval $A_1$ equal to that swept out by the disc 63 as strip 40 travels a distance $u$ over roll 60. Under calibrated conditions, each interval $A_1$ contains $n$ equiangularly spaced magnetic indicia of which all but one around the disc are provided by the shown indicia 69. Disc 63 also has thereon one permanent gating indicia 70 providing a substantially stronger output signal from head 65 than do indicia 69 and used both for measuring $L_1$ (like an extra indicia 69) and for recalibrating as later described. The number of indicia 67, 68 in each interval $A_2$ on disc 64 equals $n$, the number of indicia in each interval $A_1$ on disc 63. Preferably, $n=2^p$ where $p$ is an integer. Thus, $n$ can equal 128, 256, 512 and so forth.

As strip 40 moves through stand 43, the resulting rotation of disc 63 and passage of indicia past head 65 causes the generation from the head of pulse signals supplied through a three-position switch 75 (thrown to lower position) to a limiting amplifier 76 which clips off the top of the signal from indicia 70 to make it of the same amplitude as the signals from the other indicia. From 76, the $L_1$ pulse signals are fed via lead 77 to the input of a binary counter 80 having $p$ stages and adapted to count to $n=2^p$ before self-resetting. The same $L_1$ pulses are fed to a delay device 81 to control the shift rate of the $\Delta t$ signal (fed through a summing amplifier 82 to that device) so as to cause the $\Delta t$ signal to arrive at the output of device 81 at the moment of arrival between the rolls of stand 43 of the point of the strip from which the $\Delta t$ signal was derived. Device 81 may be comprised, for example, of an A/D converter followed by a shift register (whose shift rate is controlled by the $L_1$ pulses) followed by a D/A converter.

For purposes of controlling counter 80, the pulse derived from each passage of indicia 67 (on disc 64) beneath head 66 is fed from that head through a three-position switch 85 (thrown to lower position) and to an amplifier 86 which is thresholded to pass the pulse signal from "large" indicia 67 but not those from the small indicia 68. Each pulse which passes through that amplifier is fed by lead 87 to counter 80 to reset that counter and, further, to produce a readout from the counter both of the direct count of $L_1$ pulses then registered by the counter and of the complement of that direct count.

To explain further, the operation of counter 80, we define the aforementioned quantity $L_2$ as being equal (for measurement purposes) to the angular interval $A_2$ through which disc 64 sweeps between two consecutive passages under head 66 of a primary indicium 67 on disc 64. Then an angular interval $A_2$ swept out by disc 64 would correspond to $L_2$ and, consonantly, a count of $n$ input pulses registered by the counter between consecutive resettings thereof would correspond to $L_2$. Note in this connection that the counter 80 is reset each time disc 64 moves through an interval $L_2$.

Now, assume that the counter has just been reset by a primary indicia pulse signal from disc 64. During the ensuing period in which disc 64 is sweeping through an interval $L_2$, disc 63 sweeps through an interval $L_1$ represented by the feeding to the counter of $m$ input pulses which are registered by the counter as a count $m$ appearing in the form of a multidigit binary code on the direct code outputs of the counter. Also, the production of the count $m$ on such direct code outputs will result in the production on the complement code outputs of the counter of a multidigit binary code representing the number $n-m$. If, however, as stated, the numbers $n$ and $m$ correspond to, respectively, the quantities $L_2$ and $L_1$, then $n-m$ corresponds to the quantity $\Delta L$. Hence, for each period during which disc 64 sweeps out an angular interval $L_2$, the primary indicia pulse from the disc 64 which signals the end of such period causes the readout from the counter of direct and complement binary codes numerically representative of, respectively, the quantities $L_1$ and $\Delta L$ corresponding in that period to the quantity $L_2$. Over a succession of such periods, the values of $L_1$ and $\Delta L$ which are obtained per period will or may vary, but the value of $L_2$ remains fixed.

The direct and complement code outputs are fed from counter 80 to the D/A converters 90 and 91 respectively. Converters 90 and 91 also receive, respectively, the delayed $\Delta t$ analog signal and the $\overline{G}_2$ analog signal from detector unit 51. Since the $\overline{G}_2$ signal is constant, it can also be supplied from a potentiometer (in which case unit 51 would be used to supply only the $\Delta t$ signal).

Converters 90 and 91 each act in a well known manner as a multiplier of the two signal inputs to that converter Hence, converter 90 provides an output representing $L_1\Delta t$, and converter 91 provides an output representing $\overline{G}_2\Delta L$. Those two outputs are combined in differential amplifier 95 to yield therefrom an output of $L_1\Delta t - \overline{G}_2\Delta L$ or of $L_2\Delta G_2$ which is scaled down by potentiometer 96 to a signal corresponding in value to the predicted error $\Delta G_2$.

From what has been said, it will be clear that the FIG. 3 system as so far described is a practical implementation of the mode for solving for $\Delta G_2$ expressed by equation (5).

Assuming that follow-on correction is not used, each $\Delta G_2$ signal which results from an $L_2$ sweep of disc 64 is passed unchanged through a summing amplifier 100 and a further amplifier 101 which is adapted to have variable gain, but for which the gain $k$ is set at unity when there is no follow-on correction. From amplifier 101, each of the produced succession of intermittent $\Delta G_2$ signals is fed to a buffer stage 102 which stores the last-received signal until signaled by a primary indicium pulse from disc 64 to clear itself of the signal value last received and to store the $\Delta G_2$ signal value then arriving at the buffer stage.

The output of stage 102 is a continuous $\Delta G_2$ signal fed via lead 103 to a computer 105 providing an output signal $-\Delta S$ for controlling gap adjuster mechanism 44 to vary the size of the gap between rolls 41 and 42 so as to tend to eliminate any deviation from $\bar{G}_2$ in the actual thickness of strip 40 on the output side of stand 43. The signal $-\Delta S$ is of opposite sign to $\Delta G_2$ because if $\Delta G_2$ is a prediction that the error in output thickness will be positive, then the correction made to the size of the roll gap should be negative, i.e., in the direction to decrease the size of the gap. As shown, computer 105 exerts closed loop control on the roll gap size in that a feedback sensor device 106 responds to the actual change in setting of the roll gap size to feed back to the computer a signal $e$ which indicates the so-far attained change in setting, and which reduces accordingly the change in setting commanded by the $-\Delta S$ signal. To such end, computer 105 may be a simple operational amplifier which combines the inputs thereto of $e$ and $\Delta G_2$ in appropriate sign relation to yield an output $-\Delta S$ of appropriate sign. On the other hand, computer 105 may be a more complicated operational circuit in which $-\Delta S$ is corrected in accordance with further signals supplied to the computer as, for example, signals representative of the temperature, input tension and output tension of the strip and fed into the computer via inputs 107, 108, 109.

FIG. 5

Figure 5:
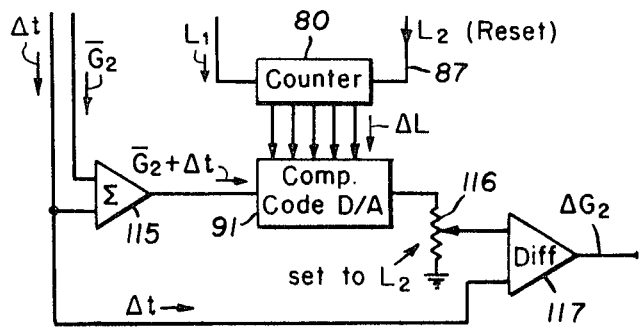
FIGS. 5, 6 and 7 are schematic diagrams of modifications of the FIG. 3 system.

The FIG. 3 system may be modified by replacement of the computational circuitry shown in FIG. 3 by that shown in FIG. 5. In the FIG. 5 modification, no use is made of the direct code D/A converter of FIG. 3. The delayed $\Delta t$ signal and the $\bar{G}_2$ signal are both supplied to a summing amplifier 115 which accordingly provides an output of $\bar{G}_2 + \Delta t$ fed to the complement code D/A converter 91. Such converter acts, as described, as a multiplier to yield the signal $(\bar{G}_2 + \Delta t) \Delta L$ which, in effect, is divided by the quantity $L_2$ by passage through an attenuating potentiometer 116. The output of element 116 and the delayed but otherwise unmodified $\Delta t$ signal are then combined by differential amplifier 117 to yield the $\Delta G_2$ signal thence supplied (in FIG. 3) to amplifier 100.

It will be seen that the FIG. 5 modification is a practical implementation of equation (9). Because of its simplicity, the FIG. 3 system as modified by FIG. 5 is preferred.

FIG. 6

Figure 6:
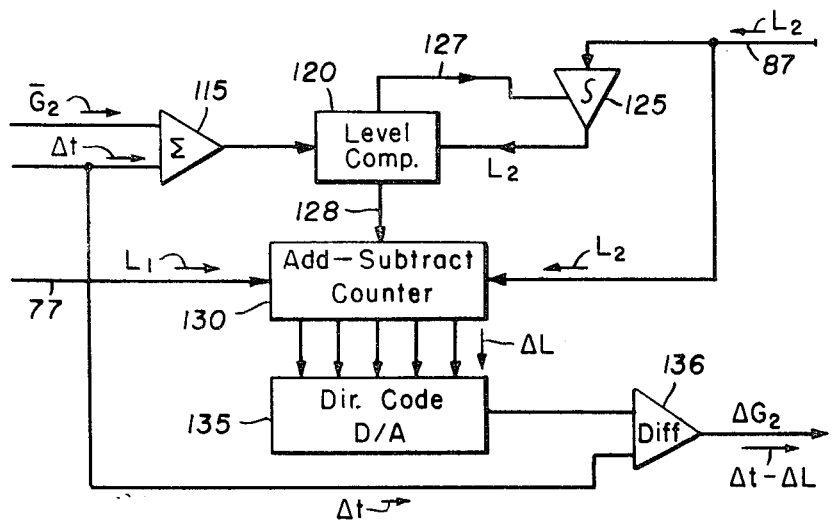

In the modification of the FIG. 3 system sown by FIG. 6, the output $(\bar{G}_2 + \Delta t)$ of amplifier 115 (FIG. 5) is supplied as one input to a level comparator circuit 120. For the purposes of FIG. 5, the pulse signals used from the head 66 (FIG. 3) for disc 64 are not merely the pulses derived from the one or primary indicia but are the pulses derived from both indicia 67 and 68. It will be recalled that $n$ of such pulses will be derived per $L_2$ interval swept out by disc 64.

To the end of making all of such pulses available, amplifier 86 is modified from a threshold type which passes only the large strength pulses from indicium 67 to a clipping type amplifier which passes all received pulses but clips off the top of the large strength pulses from the last-named indicium.

The $L_2$ pulses from amplifier 86 are fed to a resettable integrator 125 which generates at its output an analog $L_2$ signal with a sawtooth waveform after each resetting of the integrator and which rises in amplitude in proportion to the number of $L_2$ pulses received by the integrator. That sawtooth signal is supplied to level comparator 120. When the level of the sawtooth $L_2$ reaches that of the $(\bar{G}_2 + \Delta t)$ signal fed to comparator 120 from amplifier 115, the comparator responds to that equality condition to generate a reset pulse fed on lead 127 to integrator 125 to reset that integrator. The same reset pulse is fed on lead 128 to clear and reset an add-subtract binary counter 130.

Counter 130 receives both the $L_2$ pulses on lead 87 and the $L_1$ pulses on lead 77. The counter operates to register digitally the difference $\Delta L$ between the accumulated count of $L_2$ pulses and the accumulated count of $L_1$ pulses. The reset pulse on lead 128 causes transfer to a D/A converter 135 of the $\Delta L$ multidigit binary number code registered at that time by counter 130. Device 135 converts such code into an analog $\Delta L$ signal supplied as one input to a differential amplifier 136 also receiving the delayed $\Delta t$ signal. Amplifier combines the signal inputs thereto so as to provide a signal output of $(\Delta t - \Delta L)$ or, in other words, of $\Delta G_2$. As before, the $\Delta G_2$ signal is fed to amplifier 100 (FIG. 3).

The FIG. 6 modification of FIG. 3 is, accordingly, a practical implementation of equation (10). A difference between the FIG. 6 mode of arriving at the $\Delta G_2$ signal and the modes of FIG. 3 and FIG. 5 is that in FIGS. 3 and 5 the $\Delta G_2$ signal is derived from a value of $L_2$ which remains fixed over a succession of determinations of $\Delta G_2$, whereas, in FIG. 6 the quantity $L_2$ is necessarily variable over that succession because $L_2$ is set equal in each determination to $(\bar{G}_2 + \Delta t)$ which itself may vary from one determination to the next.

By way of after comment on FIGS. 3 and 5, it should be noted that counter 80 need not have $p$ stages so as to be able to accumulate a total count of $n=2^p$ before self-resetting where a count of $n$ corresponds to one $L_2$ interval swept out by disc 64. Instead counter may have a lesser number $r$ of stages so that receipt by the counter of $n$ pulses would cause the counter to go through $2^{p-r}$ complete counting cycles by self-resetting of the counter. With such a counter of $r$ stages, the total number of $L_1$ pulses counted by the counter in all except the last of the counting cycles occurring in one $L_2$ interval is a number which corresponds to a reference length $L_c$ for the quantity $L_1$. Then, providing that $L_c$ is smaller than the smallest value $L_1$ might attain in practice during the sweeping out of the fixed $L_2$ interval, the quantity $L_1$ corresponding to such fixed $L_2$ can be determined by simply adding to the constant reference length $L_c$ the vernier length quantity $L_r$ registered as count $n'$ by the counter with $r$ stages during the last of its counting cycles in an $L_2$ interval (such last cycle being cut short before self-resetting takes place by the resetting of the counter by the pulse derived from indicium 67 of disc 64). Where, in FIG. 3, a signal corresponding to $L_1$ is needed, the addition of reference length $L_c$ and vernier length $L_r$ can readily be effected by simply adding to D/A converter 90 an extra element (e.g. an extra resistor where the converter is comprised out of resistors of values $1, 2, 4 \ldots 2^n$ permutatively switchable in or out of circuit) which multiplies the $\Delta t$ input to the converter with the quantity $L_c$ to supplement the normal output $\Delta_r$ of the converter by the quantity $\Delta t L_c$ so as to yield a total output of $\Delta t(L_c + L_r) = L_1 \Delta t$. Both in FIG. 3 and in FIG. 5, however, the use of a counter 80 with $r$ stages will have no effect on the obtention of the $\Delta L$ signal because a $\Delta L$ signal of the same value will be obtained (in the way already described) whether counter 80 has $p$ stages or $r$ stages.

As a practical example, let us say that $n=512$ (so that $p=9$) but $r=5$ so that counter 80 can count only up to 32 before self-resetting. Let us also say that for a sweeping by disc 64 through one $L_2$ interval (corresponding to a count $n$ of 512 pulses), the length $L_1$ which corresponds to $L_2$ is given by a count $m$ of 490 pulses. Then, from the start of the sweeping of such interval until the end thereof, the counter 80 will undergo $2^{9-5}$ or 16 counting cycles. At the end of the 15th of such cycles, the total number of pulses so far counted by device 80 will be $15 \times 32$ or 480 pulses so that $L_c = 480$. During the last or sixteenth cycle, counter 80 will accumulate and register as direct code a further count of 10 before being automatically reset by the pulse derived from the primary indicium 67 on disc 64. Hence $L_r = 10$, and the measure of $L_1$ is obtained by the addition of $L_c$ and $L_r$ to yield 490. During the same sixteenth cycle, when counter 80 registers $L_r$ as having a value of 10 represented by the direct code, counter 80 will register the quantity $\Delta L$ as having a value of $(32-10)=22$ by the complement code output of the counter. The same value of $\Delta L$ will be registered by the counter whether it has $p$ stages or $r$ stages in the example considered.

RECALIBRATION

The length relationships utilized in the foregoing embodiments are that:

$$u = K_1 A_1 \quad (16)$$

$$u = K_2 A_2 \quad (17)$$

where $K_1$ and $K_2$ are scaling factors and there are $n$ equiangularly spaced indicia in each interval $A_1$ on disc 63. Under such conditions if $L_2$ is defined as an indicium count of $n$ and is set equal to the interval $A_2$ on disc 64, then $L_1$ equals the number of indicia on disc 63 which pass under the head 65 therefor in the course of the sweeping out of one $L_2$ interval by disc 64.

From (16) and (17) it follows that:

$$K_1 A_1 = K_2 A_2 \quad (16)$$
$$A_1/A_2 = K_2/K_1 \quad (17)$$

In the use of the described systems, wear on the rolls 60 and 61 and other factors may tend to change the respective values of the scaling factors $K_1$ and $K_2$. It can be shown, however, that such change in the individual values of $K_1$ and $K_2$ has no effect on the accuracy of the results obtained so long as the value of the ratio $K_2/K_1$ remains constant.

It can happen, however, that after prolonged use of the described systems, the value of $K_2/K_1$ may drift far enough away from its initial value so that recalibration is necessary. The recalibration is carried out as follows.

Rolls 41 and 42 are opened to make the gap therebetween large enough so that the rolls do not effect any thickness reduction. Next, a suitable length of strip 40 is drawn through the gap and over rolls 60 and 61 to cause their simultaneous rotation. Switches 75 and 85 are then thrown to middle position to connect head 65 to oscillator 140 so as to cause erasure from disc 63 of all indicia except permanent gating indicium 70. Next, switches 75 and 85 are thrown to upper position to connect head 66 to head 65 through a path including in series an amplifier 141 (which clips the pulse from indicium 67 to make it the same strength as the pulses from indicia 68) and a normally closed gate circuit 142. As long as circuit 142 is closed, no pulses from head 66 reach head 65. To initiate pulse transfer, an auxiliary readout head 143 for disc 63 is coupled by closure of a switch 144 to the input of a bistable flip-flop 145 controlling gate count 142 and normally in a state to keep count 142 closed. When, however, indicium 70 passes under head 143, the resulting pulse triggers flip-flop 145 to its opposite state which renders gate circuit 142 conductive of pulses. As, thereafter, the rolls 60 and 61 are rotated by the movement of strip 40 through the wide-open roll gap, pulses derived from the indicia on disc 64 are transferred from head 66 to head 65 to be recorded as new indicia around disc 63. Such recording continues until permanent indicium 70 passes again under head 143 to cause a driving of flip-flop 145 to its initial state, a consequent closing of gate circuit 142, and a consequent ending of the flow of pulses from head 66 to head 65 and of the recording of indicia on disc 63. Since the linear amount of movement of strip 40 which caused disc 64 to sweep out an angular interval $A_2$ containing $n$ indicia 67, 68 will have also caused $n$ indicia (including indicium 70) to appear within the angular interval of movement of disc 63 which was engendered by that same linear amount of movement of strip 40, disc 63 and 64 will now be in mutually recalibrated relation.

Since, as pointed out, the accuracy of the results obtained by the systems of FIGS. 3, 5 and 6 is independent of any change in the respective values of the scaling factors $K_2$ and $K_1$ so long as the ratio $K_2/K_1$ remains constant in value, it is not necessary that there be a fixed numerical relation between the size of the angular interval $A_2$ on disc 64 and the number of indicia contained in that interval. Hence, discs 63 and 64 may also be recalibrated (as they are driven by the linear movement of strip 40) by first erasing all indicia from both discs except for the indicia 67 and 70, then simultaneously recording pulses derived from a common pulse signal generator on both of discs 63 and 64 so as to form new indicia around the full circumference of each disc, and, further, using the indicia 67 and 70 (in the manner before described in connection with disc 63) to prevent the recording of new indicia on, respectively, discs 64 and disc 63 through an angular extent of greater than 360° on each.

FOLLOW-ON CORRECTION

After strip 40 has been rolled, any residual departure $\Delta G_{2a}$ in the actual thickness of the output strip from the desired value $\bar{G}_2$ is measured by a follow-on thickness gauge comprised of a source 150 of X-rays and an X-ray detector unit 151 yielding an $\Delta G_{2a}$ signal as an output therefrom. That signal is fed to a switch 152, which is closed only when follow-on correction is desired. Various modes of such correction are provided for.

In one mode, a switch 153 is closed to feed the $\Delta G_{2a}$ signal to a low-pass filter 154 which eliminates from the signal all but long term fluctuations thereof. The filtered signal may then be directed by switch 155 either to summing amplifier 82 or to the summing amplifier 100. The correction of the $\Delta G_{2a}$ signal to summing amplifier 82 results in the practical implementation of equations (14) and (15) when the system used is, respectively, the FIG. 5 system and the FIG. 6 system.

Another mode of follow-on correction is as follows. While switch 155 connects the low-pass filtered component of the $\Delta G_{2a}$ signal to summing amplifier 100, the unfiltered signal is connected by switch 160 to a high-pass filter 161 which derives from the $\Delta G_{2a}$ a signal the component thereof corresponding to the short term fluctuations of the signal. That high-pass component is supplied as one input to a gain adjusting circuit 165. Another input to circuit 165 is the partly corrected $\Delta G_2$ Signal from summing amplifier 100 after such signal has been delayed by passage through a delay device 166 for a time such that the partly corrected $\Delta G_2$ signal arriving at circuit 165 was derived from the same part of strip 40 as that from which was derived the high-pass component of the $\Delta G_{2a}$ signal then appearing on the other input to circuit 165. To effect that proper amount of delay of the partly corrected $\Delta G_2$ signal, the rate of passage thereof through device 166 (which may be an A/D converter followed by a shift register followed by a D/A converter) is controlled by pulses derived from the indicia 67, 68 on disc 64 and fed to device 166 from head 66 through a clipping amplifier 167 which equalizes the strength of the pulse from indicium 67 with the strength of the pulses from indicia 68.

Figure 4:
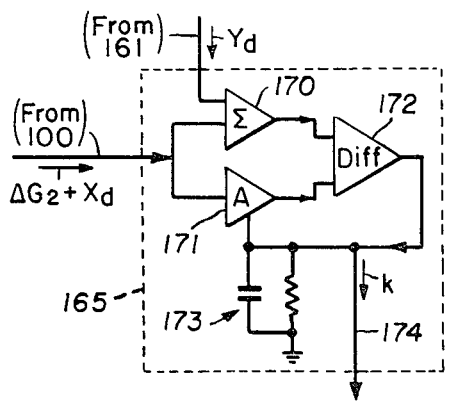
FIG. 4 is a schematic diagram of a detail of the FIG. 3 system.

Within the gain adjustment circuit 165, the partly corrected delayed $\Delta G_2$ signal is fed to a summing amplifier 170 (FIG. 4) and to a variable gain amplifier 171. Another input to amplifier 170 is the high-pass $\Delta G_{2a}$ component from filter 161. The respective outputs of amplifiers 170 and 171 are fed to a differential amplifier 172 which computes the difference therebetween and feeds back such difference to a resistor-capacitor circuit 173 to develop across such circuit a voltage controlling the gain $k$ of amplifier 171 so as to cause the output of that amplifier to become equalized with the output of amplifier 170. Circuit 173 is connected by a lead 174 to the variable gain amplifier 101 to cause that amplifier to have the same gain as amplifier 171.

The theory behind the mode of follow-on correction just described is as follows:

Let $$\Delta G_{2a} = X + Y \quad (18)$$

wherein $X$ is the low-pass component of the signal and $Y$ is the high pass component thereof. Component $X$ represents the long-term fluctuations of $\Delta G_{2a}$ and, thus, an actual error in the operation of the system which is independent of the constantly changing predicted error $\Delta G_2$. Accordingly, the error component $X$ is algebraically additive with $\Delta G_2$ and can be delayed in relation to $\Delta G_2$.

On the other hand, the error component $Y$ represents short term fluctuations in $\Delta G_{2a}$ and, therefore, can reasonably be assumed as correlated with $\Delta G_2$ and proportional to $\Delta G_2$. In other words, the presence of a component $Y$ indicates that a multiplying operation should be performed on $\Delta G_2$ in order to eliminate all error from the system. Because, however, $Y$ is dependent on $\Delta G 2$, the value of the multiplying factor should be determined by a comparison of respective values of $\Delta G_2$ and $Y$ which are derived from the same part of strip 40, wherefore, since Y is necessarily delayed (because gauge 150, 151 is necessarily placed some distance away from stand 43 on the output side thereof), it is also necessary to delay by the same amount (by device 166) the $\Delta G_2$ signal compared with component Y.

Gain adjustment circuit 165 serves to compute a gain $k$ which corresponds to the mentioned multiplying factor.

If we designate by the subscript $d$ a delayed error and by the subscript $p$ a presently predicted error, then the computed gain $k$ yielded by circuit 165 is:

$$k = \frac{X_d + \Delta G_{2d} + Y_d}{X_d + \Delta G_{2d}} \quad (19)$$

The same gain $k$ is manifested in variable gain amplifier 101 which receives an input of $X_d + \Delta G_{2p}$. The output of amplifier 101 is, therefore:

$$s = \frac{(X_d + \Delta G_{2p})(X_d + \Delta G_{2d} + Y_d)}{X_d + \Delta G_{2d}} \quad (20)$$

or $$s = \Delta G_{2p} + G_{2rp} = \Delta G_{2p} + \Delta G_{2ad} \quad (21)$$

where $\Delta G_{2rp}$ is the residual error which is presently predicted as the result of the determination (by the systems of FIG. 3, 5 and 6 without the benefit of follow-on) of a presently predicted main error $\Delta G_{2p}$ of some particular value.

If there is present a significant amount of the error component Y in the operation of the disclosed systems, the mode of follow-on correction just described should be more effective to ultimately result in elimination of all residual error than the other mode of follow-on connection wherein only the long-term error component $X_d$ is added to $G_{2p}$. That is so because the correction of $\Delta G_{2p}$ by the factor $\Delta G_{2rp}$ is based on the use of both the low-pass and high-pass components of the delayed residual error $\Delta G_{2ad}$ signal (and thus, on that entire signal) whereas the correction by the factor $X_d$ above omits the use for correction purposes of the $Y_d$ component which, nonetheless, may be a significant residual error component. Also, the correction of $\Delta G_{2p}$ by the factor $\Delta G_{2rp}$ has the extra advantage that while the $\Delta G_{2ad}$ signal is necessarily a delayed signal and thus cannot provide real time information on the residual error which will actually result in the presence of a $\Delta G_{2p}$ signal of some particular value, the value of the $G_{2rp}$ factor is determined by the proportional correlation between $\Delta G_{2d}$ and $Y_d$ signals which were obtained from the same point of strip 40, wherefore such correlation (although a time-past correlation) should remain substantially fixed over time to permit accurate prediction or anticipation (by the $\Delta G_{2rp}$ factor) of what the total residual error will be when the main presently predicted error signal $\Delta G_{2p}$ is of any value within its range of variation.

If, on the other hand, the $Y_d$ error component of the system is negligible, then the gain K given by equation (19) reduces to unity gain and, as it should be, the main predicted error signal $\Delta G_{2p}$ is corrected only by the $X_d$ component so as to yield at the output of amplifier 101 a corrected error signal of $(\Delta G_{2p} + X_d)$.

Figure 7:
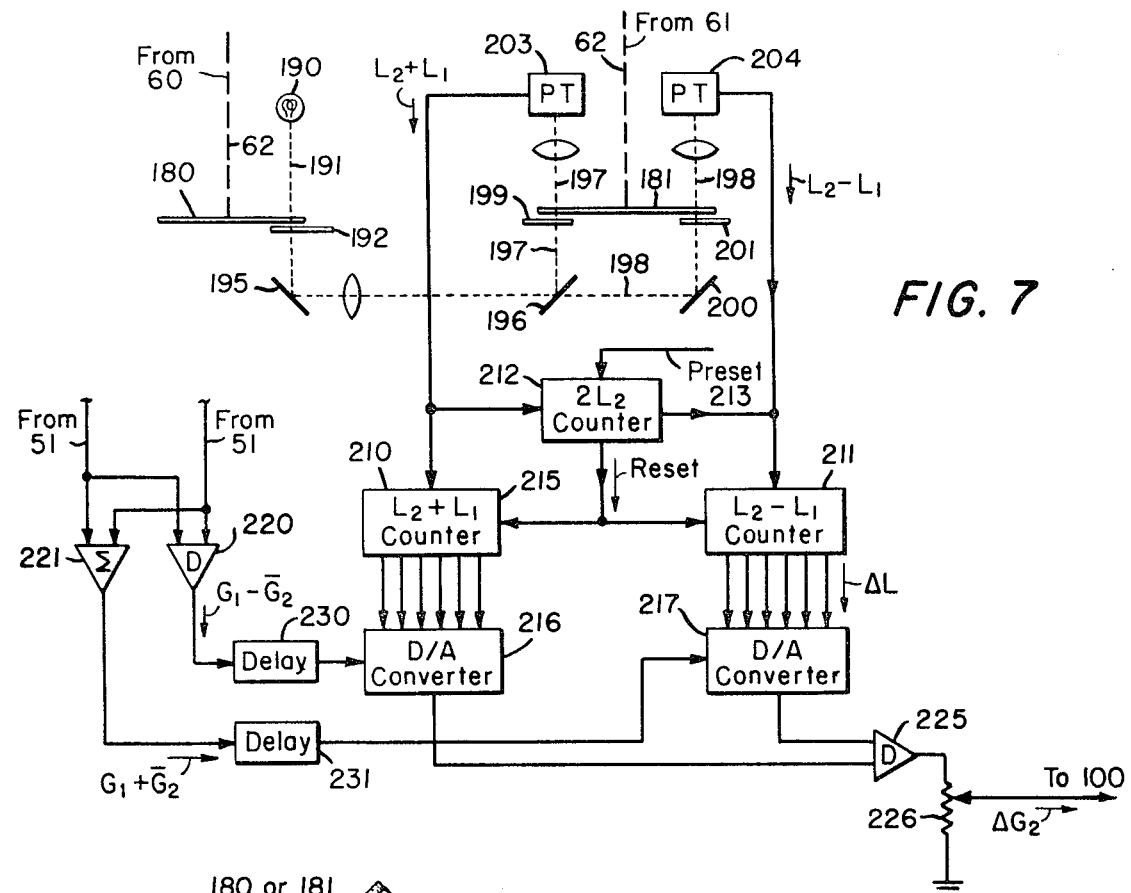
Figure 7A:
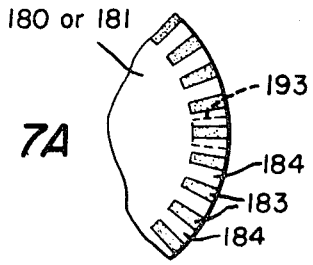
FIG. 7A is a fragmentary front elevation of a detail of the FIG. 7 modification.

FIGS. 7 and 7A

Returning to equations (4) and (7), if the left-hand sides of these equations are added together and their right-hand sides are also added together, the result would be:

$(L_2 + L_1(G_1 - \overline{G}_2) - (L_2 - L_1)(G_1 + \overline{G}_2) = 2L_2 \Delta G_2 \quad (22)$ Equation (22) is of interest because its left-hand side consists wholly of sum and difference quantities.

A practical implementation of equation (22) is shown by FIGS. 7 and 7A. In the FIG. 7 showing the rotations of the rolls 60 and 61 (FIG. 3) are transmitted by couplings 62 to, respectively, an optical disc 180 and an optical disc 181. Discs 180 and 181 are similar transparent discs characterized around the periphery of each by a series of equiangularly spaced similar opaque indicia bars 183 (FIG. 7A) alternating with transparent inter-bar voids 184 of the same angular width as the bars.

A light source 190 (FIG. 7) generates a light beam 191 projected through the periphery of disc 180 at the right hand side thereof and then through the aperture of an aperture plate 192. The outline shape of the mentioned aperture is shown by the dotted line 193 in FIG. 7A, such aperture having an angular width equal to the angular width of indicia bars 183 multiplied by an even number. Thus, the angular width of the aperture 193 of the FIG. 7 system is twice the angular width per bar of the indicia bars 183.

After passing through the aperture in plate 192, beam 191 is bent 90° by a specular mirror 195 and is transmitted to a half-silvered beam-splitting mirror 196 which divides the initial beam 191 into a secondary beam 197 directed at right angles to beam 191 and a secondary beam 198 continuing on through the last-named mirror. Beam 197 passes through an aperture formed in an aperture plate 199 and then through the periphery of disc 181 at its left-hand side. Beam 198 is bent 90° by a specular mirror 200 and then passes through an aperture in an aperture plate 201 and through the periphery of disc 181 at its right hand side. In each of plates 199 and 201, the aperture therein is of an angular width the same as that of aperture 193 in plate 192. After the secondary beams 197 and 198 each pass through disc 181 they impinge on, respectively, a photoelectric transducer 203 and a photoelectric transducer 204 of which each may be, for example, a phototransistor.

Incorporated in the FIG. 7 system are suitable optical means (not shown in detail but represented by lenses 206, 207, 208) for (a) causing a real image of the opaque-transparent bar pattern derived from disc 180 seen through aperture 193 to be focused on the plane of disc 181 within the fields of view defined by each of the aperture plates 199 and 201, and (b) causing an image of the light pattern formed within these two fields of view to be focused on, respectively, the transducer 203 and the transducer 204. In the case of the left-hand transducer 203, the bars of the image at disc 181 derived from disc 180 will move angularly in a direction opposite to that of the opaque indicia bars on disc 181. Hence, the movements of the bar patterns on discs 180 and 181 will be additive in effect in respect to transducer 203 to enable that transducer (with the aid of conventional wave shaping circuitry, not shown) to generate $L_2 + L_1$ electrical pulses (in response to the light received thereby) for a predetermined attained value of $2L_2$. In the case of right-hand transducer 204, however, the bars of the image at disc 181 derived from disc 180 will be moving angularly in a direction the same as that of the opaque indicia bars on disc 181. In the latter case, therefore, the two bar movements are subtractive in respect to the light received by transducer 204 to enable that transducer (with the aid of associated conventional wave-shaping circuitry, not shown) to generate $L_2 - L_1$ electrical pulses (in response to the light received thereby) for a predetermined attained value of $2L_2$.

The pulses from transducers 203 and 204 are fed to respectively a binary counter 210 and a binary counter 211. Also the pulses from both transducers are fed to a binary counter 212, which registers a count equal to the sum of the pulses received from transducer 203 and the pulses received from transducer 204. That is, counter 212 represents by it count the magnitude at any time of the quantity $(L_2 + L_1) + (L_2 - L_1)$ or $2L_2$.

When the $2L_2$ count on counter 212 reaches a predetermined value $2\overline{L}_2$ preset into the counter by lead 213, the counter resets itself to zero count and concurrently generates a reset pulse fed by lead 215 to each of counters 210 and 211 to cause the $L_2 + L_1$ count then registered on 210 to be transmitted to a digital-to-analog converter 216 and the $L_2 - L_1$ count then registered on 211 to be transmitted to a digital-to-analog converter 217.

Converter 216 receives an analog "reference" signal representative of the quantity $(G_1 - \overline{G}_2)$ and formed by combining separate $G_1$ and $\overline{G}_2$ signals from detector 51 (FIG. 3) in a differential amplifier 220. Converter 217 receives an analog "reference" signal representative of the quantity $(G_1 + \overline{G}_2)$ and formed by combining the mentioned $G_1$ and $\bar{G}_2$ signals in a summing amplifier. Converters 216 and 217 operate in a well known manner as signal multipliers to yield respective analog output signals corresponding to, respectively, the quantities $(L_2+L_{1a})$ $(G_1-\bar{G}_2)$ and $(L_2-L_1)$ $(G_1+\bar{G}_2)$. The latter quantity is subtracted from the former by differential amplifier 225 to yield as an output from that amplifier a signal representative of $2L_2\Delta G_2$ in accordance with equation (22). Such signal is then attenuated to a $\Delta G_2$ signal by a "$2L_2$" potentiometer 226. Such $\Delta G_2$ signal appears on the top of the potentiometer 226 and may be further utilized as described in connection with FIG. 3.

Some interesting features of the FIG. 7 system are as follows. First, since the angular width of the aperture 193 (FIG. 7A) is an even multiple of the angular width per bar of the black and white bar pattern around disc 180, the postaperture light flux in beam 191 remains constant for any positioning of the bars of the bar pattern within the field of view of aperture 193. Moreover, because the apertures in plates 199 and 201 have an angular width which is an even multiple of the angular width per bar of the bar pattern around disc 181, if disc 180 were to be removed, the postaperture light flux of each of beams 197 and 198 would remain constant for any positioning of the bars around disc 181 within the fields of view of the last-named apertures. It follows that the FIG. 7 system is incapable by measurement of deriving signals representative of $L_1$ and/or $L_2$. Instead, the only signals derived by that system which are directly based on measurement are the "sum" $L_2+L_1$ signal and the "difference" $L_2-L_1$ signal.

Second, although, the FIG. 7 system does arrive by counter 212 at a count representative of the quantity $2L_2$, such $2L_2$ count or signal represents a computed quantity rather than one based on any measurement of the quantity $L_2$. That is, the $2L_2$ count or signal is arrived at by a computational mode utilizing two signals $(L_2+L_1)$ and $(L_2-L_1)$ of which neither is an explicit or implicit measure of $L_2$ or is based on a measurement of $L_2$, wherefore the $2L_2$ count or signal is obtained independent of any measurement of $L_2$.

Before leaving the FIG. 7 system, the following matters should be noted. First, delay units 230 and 231 (of, say, the sort earlier described) are inserted into the paths for, respectively, the $(G_1-\bar{G}_2)$ signal and the $(G_1+\bar{G}_2)$ signal in order to cause those signals to be operative in the computer system at the time of entry into the bite between rolls 41 and 42 of the portion of strip from which the $G_1$ signal was derived. Second, by passing an additional light beam through disc 180 and through an aperture which is the same or an odd multiple in angular width of the width of the bars on that disc, and by then having such beam fall on an additional phototransducer, the output from such transducer will be an $L_1$ signal. Similarly by passing an additional light beam through disc 181 and through an aperture which is the same or an odd multiple in angular width of the width of the bars on disc 181 and by then having the latter beam fall on still another transducer, the output of the last-named transducer will be an $L_2$ signal. The optically derived $L_1$ signal may be used in the FIG. 3 system in place of the magnetically derived $L_1$ signal while, concurrently, the $\Delta L$ signal from counter 211 (FIG. 7) may be used in the FIG. 3 system (with 211 being reset upon attainment of a predetermined count of $L_2$) in place of the L signal derived in FIG. 3 from the counter 80. Moreover, the optically derived $L_2$ signal may be used in the systems of FIGS. 5 and 6 in place of the magnetically derived $L_2$ signal while, concurrently, the counter 80 of FIG. 5 or the counter 130 of FIG. 6 (as the case may be) is replaced by the counter 211 (FIG. 7) adapted in this instance to clear, read out $\Delta L$ and reset when the $L_2$ signal attains a predetermined count (FIG. 5) or becomes equal to the quantity $\bar{G}_2+\Delta t$ (FIG. 6).

Figure 8:
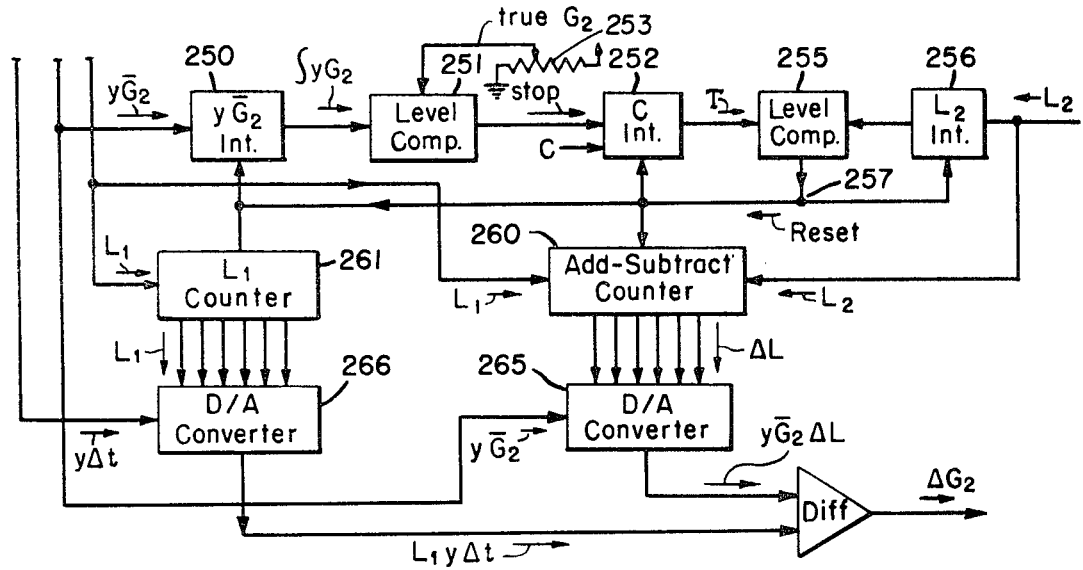
FIG. 8 is a schematic diagram of another modification of the FIG. 3 system.

Coming now to the FIG. 8 modification, suppose that the thickness gauge 51 has a variability factor $y$ such that equation (4) becomes $$L_1(y\Delta t) - (y\bar{G}_2)\Delta L = L_2 y\Delta G_2 \quad (23)$$

where $(y\Delta t)$ and $(y\bar{G}_2)$ are the measured values of true values $\Delta t$ and $\Delta G_2$.

The determination of $\Delta G_2$ can be rendered independent of $y$ as follows. Let us integrate $(y\bar{G}_2)$ with respect to time $T$ and set the integral equal to $\bar{G}_2$. That is:

$$\int y\bar{G}_2 dT = \bar{G}_2 \quad (24)$$

or $$yT\bar{G}_2 = \bar{G}_2 \quad (25)$$

or $$T = 1/y \quad (26)$$

Now let us set the $L_2$ in the right hand side of equation (23) equal to $T$ or in other words, equal to $1/y$. Then equation (23) becomes $$L_1(y\Delta t) - (y\bar{G}_2)\Delta L = \Delta G_2 \quad (27)$$

That is, equation (27) permits a solving for the true value of $\Delta G_2$ from measured values $(y\Delta t)$ and $(y\bar{G}_2)$ which incorporate the variability factor Y.

In the practical implementation of equation (27) shown by FIG. 8, a $y\bar{G}_2$ signal from gauge 51 is cyclically integrated by a resettable integrator 250. In each cycle, the integrated signal is fed to a level comparator 251 also having an input which is a measure of the true value of $\bar{G}_2$. As previously described in connection with FIG. 3, such true $\bar{G}_2$ signal can be supplied by a potentiometer as, for example the potentiometer 253 of FIG. 8. When the integrated $y\bar{G}_2$ signal reaches the level $\bar{G}_2$, comparator 251 generates a stop signal arresting the integrating action of a resettable integrator 252 which has been integrating from the beginning of that cycle a constant signal $c$ which may be, say, unit voltage. Upon being so stopped, integrator 252 holds the integrated $c$ signal at the level attained thereby at the time of stopping. The held signal has a level representative of the time period T in equations (24) to (26).

The T signal is fed as one input to a level comparator 255. The other input to 255 is the output signal from a resettable integrator 256 which integrates $L_2$ pulses derived magnetically (from indicia 68) or optically as before described. The system is so adjusted that the held T signal is always produced before the output signal from 256 reaches the level of the T signal.

When such output signal reaches the level of the T signal, the condition has been attained at which $L_2$ is equal to T, i.e., is equal to $1/y$. At that time, comparator 255 generates on lead 257 a reset signal fed to all of integrators 250, 251 and 256 to reset them to thereby start a new cycle.

The $L_2$ pulses are also fed as one input to an add-subtract counter 260 also receiving an input of magnetically or optically derived $L_1$ pulses. Counter 260 is responsive to its inputs to accumulate a count per cycle representing $\Delta L$. The $L_1$ pulses are also fed as the sole input to a counter 261 of which the accumulated count per cycle represents the quantity $L_1$. Both of counters 260 and 261 are actuated by the reset signal on lead 257 to clear and reset for a new cycle and to transfer digital signals of the count then accumulated therein to, respectively, a D/A converter 265 and a D/A converter 266. Converter 265 also receives from gauge 51 the analog $y\bar{G}_2$ signal while converter 266 receives from 51 an analog $y\Delta t$ signal.

The two converters act in a well-known manner as multipliers such that, at the end of each cycle, 265 yields an output corresponding to $y\bar{G}_2\Delta L$ and 266 yields an output corresponding to $L_1 y \Delta t$. The former output is subtracted from the latter by differential amplifier 270 to produce an output from 270 which corresponds to $\Delta G_2$ for the reasons explained in connection with equation (27).

Since the FIG. 8 system principally differs from the systems earlier described only in the feature of solving for $\Delta G_2$ by determining the value of $1/y$ and setting the desired value $\bar{L}_2$ for $L_2$ equal to $1/y$, that same feature may be incorporated in any system which is in accordance with the previous description and which does not derive $\Delta L$ in a way requiring that the value of $\bar{L}_2$ be known beforehand (i.e., does not derive $\Delta L$ in the form of a complement code as in FIGS. 3 and 5). For example, the "T" technique embodied in FIG. 8 can readily be adopted for use in practical implementations of either equation (7) or equation (22) whether the "L" quantities in those equations are derived magnetically (as in FIGS. 3 and 5) or optically (as in FIG. 7 and modifications thereof).

I claim:

1. A control system for a mill in which a body of material is passed through means which works said material to reduce said body in thickness, and in which adjusting means is responsive to a control signal from said system to adjust such working means to correct such reducing action, said system comprising, differential movement signal-generating means responsive to movements of said body on the input and output sides of said working means and adapted by quantifying the difference in value of such movements to produce a first signal derived from and representative of such quantified value, means to provide measures of actual input thickness of said body and of desired output thickness therefor, thickness differential signal-generating means adapted by utilizing such measures in subtractive relation to produce a second signal which is a function of the differential in the values of such two thicknesses, and computing means responsive to at least said first and second signals to produce said control signal by operation of such computing means comprising combining therein two signals comprised of, respectively, said first signal and said second signal.

2. A system as in claim 1 in which said first signal is a $\Delta L$ signal solely a function of the differential between corresponding lengths of said body of material which are input and output lengths relative to said working means.

3. A system as in claim 2 in which said differential thickness signal-generating means comprises, first and second sensing means disposed, respectively, on the input and output sides of said working means in operable relation with said body of material to provide respective indications $L_1$ and $L_2$ of corresponding input and output lengths of said body moving past, respectively, said first and said sensing means, and circuit means responsive to said indications to generate said $\Delta L$ signal when said $L_2$ indication attains a selected value.

4. A system as in claim 3 in which said selected value of said $L_2$ indication is a predetermined value which remains constant over a succession of determinations of said $\Delta L$ signal.

5. A system as in claim 4 in which said $L_1$ indication is in the form of successive pulses of which a number $n$ of said pulses corresponds to said predetermined value of $L_2$, and in which said circuit means comprises pulse counting means responsive to a number $m$ of such pulses received during each period attainment of said predetermined value by said $L_2$ indication derive from the count $m$ of such pulses a $\Delta L$ signal representative of the complement of the count indicated by said counting means at the end of such period.

6. A system as in claim 5 in which said counting means is responsive to such pulses to undergo a plurality of counting cycles in each such period, and in which said $\Delta L$ signal is representative of the complement of the count of the pulses received during the last of such cycles.

7. A system according to claim 11 in which said computing means derives said control signal by operation of such computing means comprising determining the value of the quantity;

$$F(\Delta t) - F(\Delta L)$$

in which $\Delta t$ is a differential between actual input and desired output values for said body's thickness, $\Delta L$ is a differential between respective movements of said body on the input and output sides of said working means, $F(\Delta t)$ is a function of $\Delta t$ selected from a set of such functions inclusive of the function $I(\Delta t)$, and $F(\Delta L)$ is a function of $\Delta L$ selected from a set of such functions inclusive of the function $I(\Delta L)$.

8. A system as in claim 7 in which the set of $F(\Delta t)$ functions is inclusive of functions of the quantity $\Delta h = \Delta t + \Delta G_{2n}$ where $\Delta G_{2n}$ is the deviation in the actual output value of said body's thickness from said desired value therefor, $\Delta h$ accordingly being equal to the differential between the actual input and output values of said characteristic.

9. The improvement for a control system for a mill in which a body of material is passed through means which works said material to reduce said body in thickness, adjusting means is responsive to a control signal from said system to adjust such working means to correct such reducing action, and in which said control signal is developed by said system in response both to movements of said body on the input and output sides of said working means and to the actual thickness of said moving body at a site on such input side, said improvement comprising, a standard sample of material disposed at said site adjacent said body and having a reference thickness, common thickness gauge means for said body and said sample, said gauge means being disposed proximate said site to measure both the thickness at said site of said body and the thickness of said sample and to partly determine as a function of at least such thickness of said body the value of said control signal developed by said system, and thickness-signal source means operable independently of the thickness measuring operation of said gauge means to produce a constant signal representative of a fixed thickness and to modify said control signal by said constant signal so as to correct said control signal for error therein produced by error in the operation of said gauge means.

10. A system as in claim 1 further comprising, movement summing signal-generating means responsive to said movements of said body on the input and output sides of said working means to produce a third signal which is a function of the sum of such movements, and thickness summing signal-generating means to produce a fourth signal which is a function of the sum of said actual input thickness of said body and said desired output thickness therefor, said computing means being responsive to said third and fourth signals as well as by operation of such computing means comprising combining therein two signals comprised of, respectively, said first and fourth signals in multiplicatively combined relation and said second and third signals in multiplicatively combined relation.

11. A control system for an installation in which a body of material is passed through means which works such material to reduce in size a dimensional characteristic of said body in at least one dimension transverse to the direction of passage, and in which adjusting means is responsive to a real time control signal from said system to adjust said working means so as to correct the size reducing action of said working means on said body of material, said system comprising, follow-on gauge means disposed on the output side of such working means and in spaced relation therefrom to provide a delayed indication of any residual deviation from desired value in said dimensional characteristic of said body as it leaves said working means, means to derive from said real time control signal a similarly delayed indication of the value of such control signal, and means responsive to such two delayed indications to correct the value of said real time control signal.

* * * * *

UNITED STATES PATENT OFFICE
CERTIFICATE OF CORRECTION

Patent No. 3,624,369          Dated November 30, 1971

Inventor(s) Ruloff F. Kip, Jr.

It is certified that error appears in the above-identified patent and that said Letters Patent are hereby corrected as shown below:

Column 15, line 46, before "derive", insert -- to -- ; line 54, cancel "11" and insert -- 1 -- . Column 16, line 41, after "as", second occurrence, insert -- to said first and second signals to produce said control signal -- .

Signed and sealed this 14th day of November 1972.

(SEAL)
Attest:

EDWARD M. FLETCHER, JR.          ROBERT GOTTSCHALK
Attesting Officer          Commissioner of Patents